Feb. 12, 1957   D. HAWLEY   2,781,051
FLEXIBLE, ROLLING-SEAL TYPE VALVES
Filed March 27, 1951   3 Sheets-Sheet 3

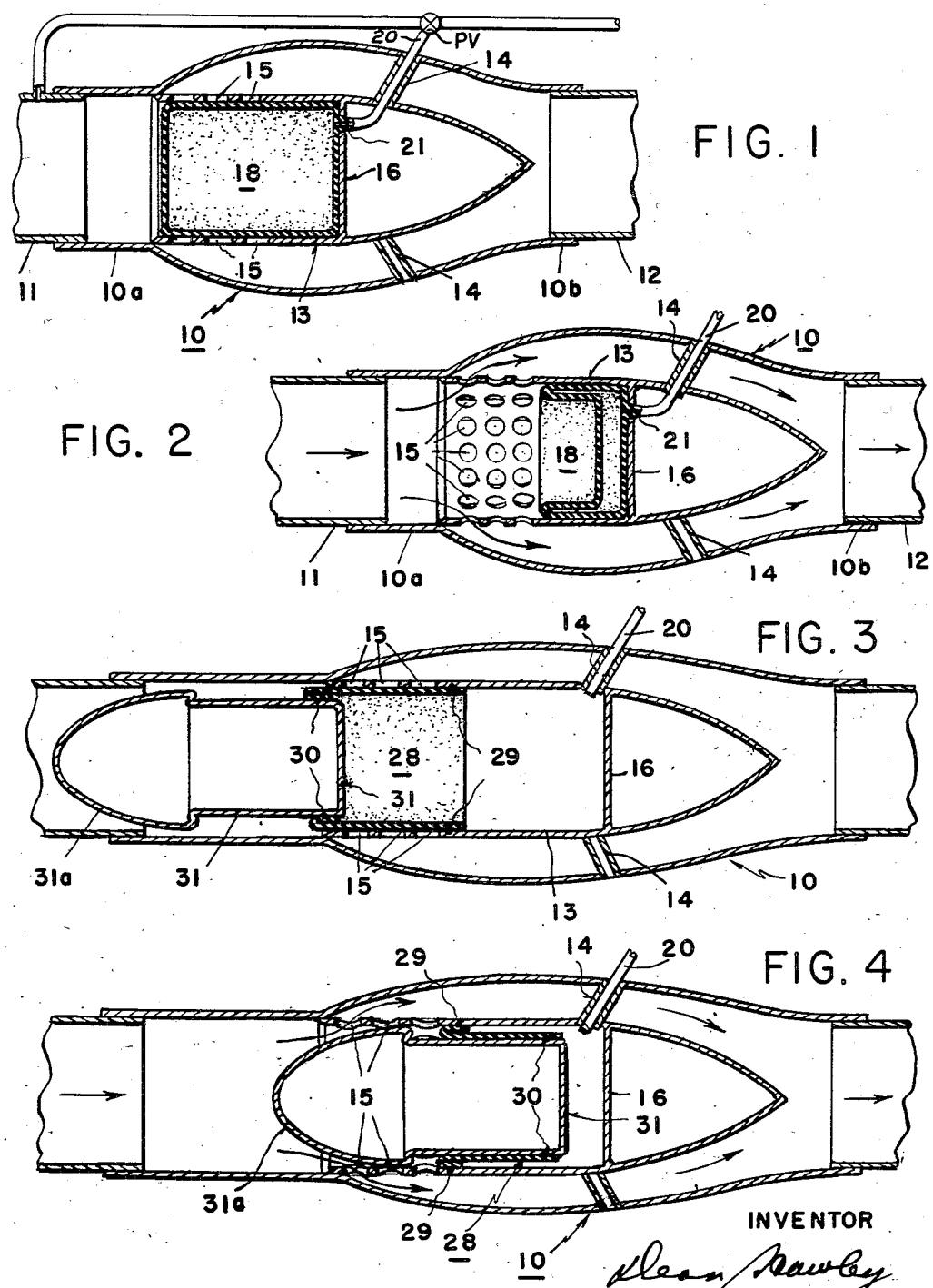

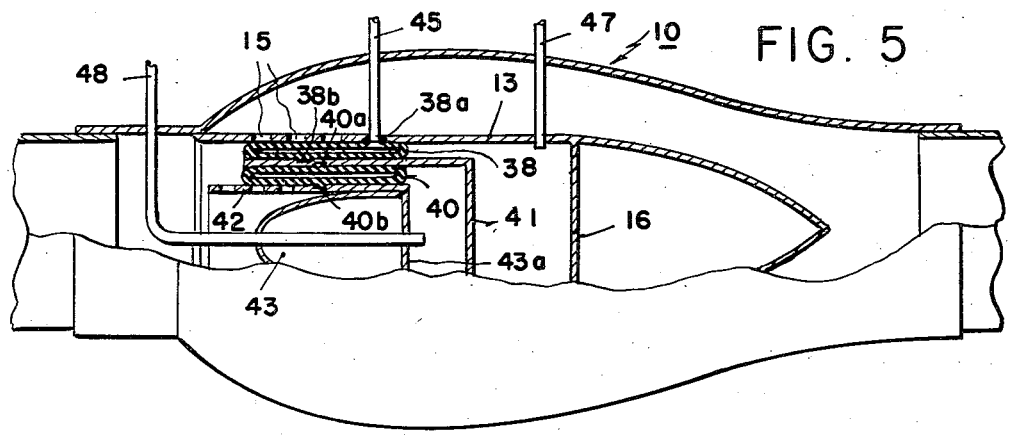
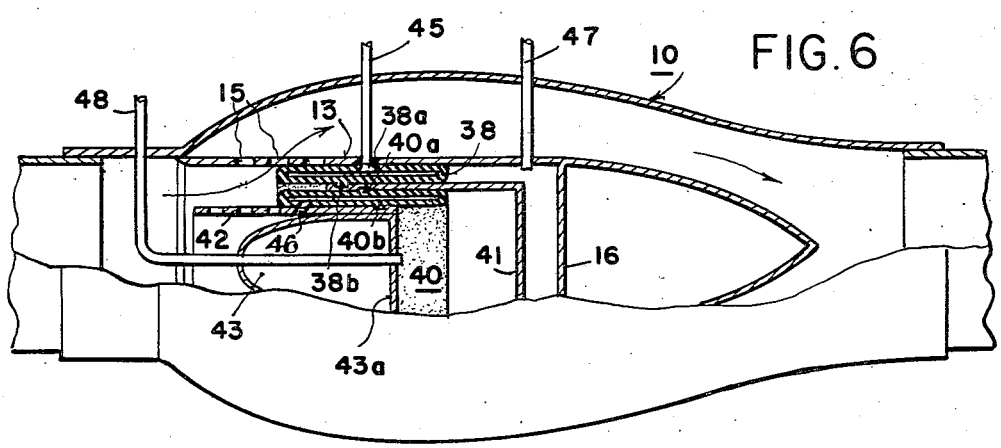
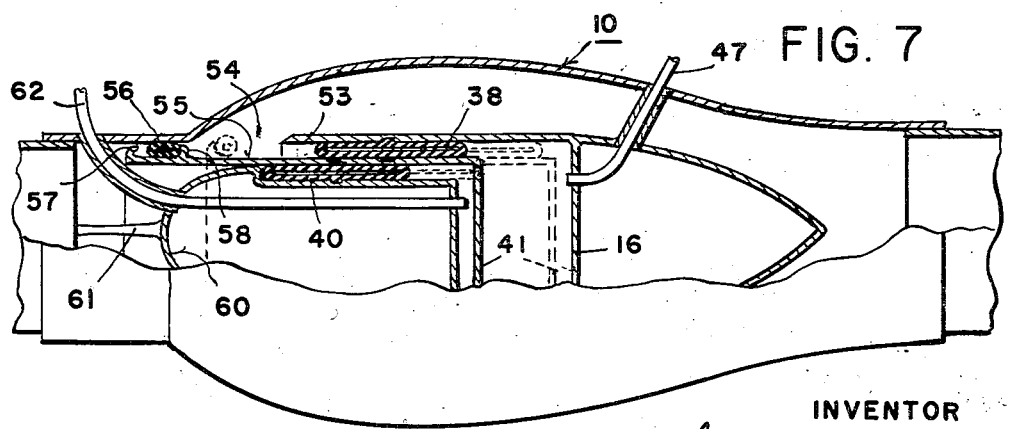

INVENTOR
Dean Hawley
BY
J. Harold Kiecoups
ATTORNEY

United States Patent Office 2,781,051
Patented Feb. 12, 1957

2,781,051

FLEXIBLE, ROLLING-SEAL TYPE VALVES

Dean Hawley, Old Saybrook, Conn.; Dean A. Hawley, administrator of said Dean Hawley, deceased, assignor to Origins Incorporated, Rye, N. Y., a corporation of New York Application March 27, 1951, Serial No. 217,810

15 Claims. (Cl. 137—219)

This invention relates to improvements in sealing means for valves and other devices. When incorporated in valve construction, in which application the invention will be described, and because the improved sealing means seals with a rolling action under internal pressure with a self-servo actuation, the improved valve may properly be characterized as a "rolling seal servo-valve."

Conventional valves employ a gate, disc, plug or corresponding sealing element which, during valve operation, is subjected to frictional contact with its seat, resulting in wear and damage to the contacting surfaces of both element and seat. This damage is of course aggravated by the presence of abrasive particles or corrosive substances often encountered in valve applications.

According to the invention, friction contact of sealing surfaces has been eliminated so as to contribute to the objectives of long life and reliability. The simplicity of design, few moving parts, and minimum metal-to-metal contact further contribute to and satisfy the additional objects of minimum machining, rapid production, and low cost.

Another object for valve application is reduction of space requirements. Conventional valves often require a clearance radius for their bonnet and hand wheel of ten to twenty times their pipe line radii, whereas in a valve incorporating the improved sealing means of the invention the usual valve bonnet, packing gland and hand wheel have been eliminated, resulting in a space requirement of only one-and-a-half to two times pipe line radii. Moreover, the conventional valve installation must provide access for its operator or be equipped with a separate power drive. In valves employing the improved sealing means, servo-action and remote control, which are further objectives of the invention, are inherent.

The above and other objects and advantages and the manner in which they are achieved will appear from the following detatiled description and accompanying drawings illustrating several forms of rolling seal self-servo valves according to the invention, in which—

Fig. 1 is a longitudinal section of an axial flow valve employing a flexible cylinder form of sealing means which is shown to be extended by internal pressure to its valve-closing position;

Fig. 2 is a view similar to Fig. 1 but illustrating the flexible sealing cylinder introverted to effect valve opening;

Figs. 3 and 4 are views similar to Figs. 1 and 2, respectively, but illustrating a modified, i. e. tubular, form of sealing means;

Figs. 5 and 6 are longitudinal quarter sections of an axial flow valve incorporating yet another, i. e. annulus having closed-loop cross section, form of sealing means of the invention, Fig. 5 illustrating the valve closed, and Fig. 6 illustrating the valve partly open;

Fig. 7 is a longitudinal quarter section illustrating a variant of the Figs. 5-6 form of valve, which is shown closed in full lines and open in dotted lines;

Figure 8:
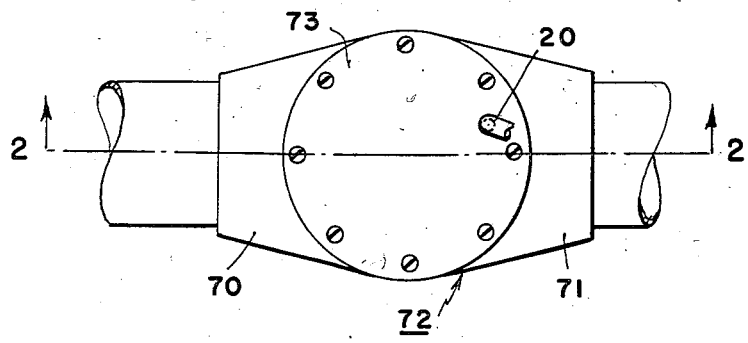
Figure 9:
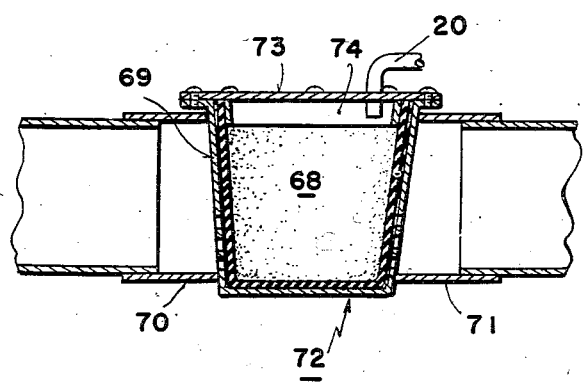
Figure 11:
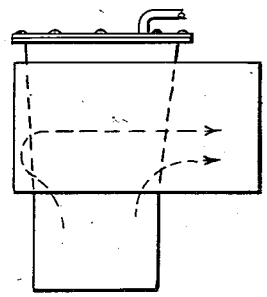
Figure 12:
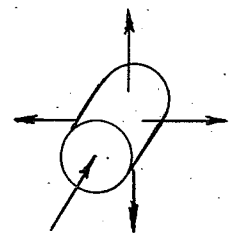
Figure 10:
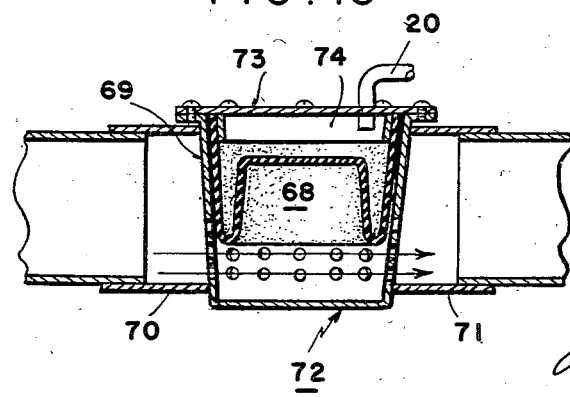

Figs. 8-10, inclusive, are plan and vertical sectional views (Figs. 9 and 10 showing the closed and open positions, respectively) which illustrate the application of the improved sealing means to a valve having the more conventional angular disposition of sealing means and direction of flow;

Fig. 11 is a diagrammatic view of another form of conventional valve to which the improved sealing means is applicable; and Fig. 12 is a diagrammatic view generally illustrating the adaptability of the improved sealing means to a multi-outlet type valve.

Referring to the drawings, reference numeral 10 (Figs. 1 and 2) designates a valve body or casing of streamlined tubular form having cylindrical fluid entrance and exit ends 10a, 10b, respectively, which is adapted to be coaxially interposed between a supply line 11 and an exit line 12. Arranged coaxially within the valve body is a substantially cylindrical orifice member 13 which is affixed along its fore end edge to the inner wall of the valve body intermediate its entrance end 10a and its streamlined body portion, so as to be disposed in the path of fluid flow through said body. Preferably, the after end of the orifice member which is closed and has streamlined form, extends into the exit end of the valve body, and is supported within the latter by suitable means such as struts 14. The cylindrical fore end of the orifice member is shown to be provided with a plurality of small-area flow orifices 15, although it is to be understood that a smaller number of larger-area orifices or a single large orifice may be employed, depending on design requirements. The interior of the orifice member is chambered as by a cross partition 16 so that the entering fluid passes outwardly through the orifices 15 and thence flows axially through the streamlined annular passage between the after ends of the valve body and orifice member to the exit line 12. It will be observed that the angular disposition of the orifices 15 to the incoming and outgoing flow directions is such as to provide a substantially unrestricted and straight-line flow path through the valve body.

A rolling seal is employed to open and close the orifices 15 which, in the present modification, takes the form of a flexible member 18 having an annular or substantially cylindrical body portion and ends which together form a closed chamber whose one (left) end serves as a piston face which is exposed to the pressure of the entering fluid. The flexible member 18 which, for convenience, is termed a "flexible cylinder" is backed by the partition 16, and its axial length is such that when extended by internal pressure at least equaling the upstream pressure as shown in Fig. 1, its annular body portion closes the orifices 15 of the orifice member 13, which latter acts as a supporting grid for the flexible cylinder. Upon the internal pressure within the flexible cylinder being substantially relieved, it rolls within itself or "introverts" under the greater upstream pressure effective on its piston face to a position illustratively shown in Fig. 2, thereby uncovering the orifices 15 and permitting flow of fluid through the valve. It will be understood that partial removal of cylinder contents results in partial introversion thereof, so that the valve may be operated as an open and shut, and as a proportioning or throttling valve.

Internal pressure from any suitable source is supplied to the interior of the flexible cylinder 18 through a suitable passage thereto, which illustratively is provided by a tube 20 extending through one of the struts 14 and the partition 16, the tube being connected to the cylinder interior through a self-sealing closure 21 generally as shown. It will of course be understood that any other appropriate means of supplying pressure fluid to the interior of the cylinder may be employed. As the terms "cylinder," "flexible cylinder" and "cylindrical" are used herein in describing the sealing means 18 and/or orifice member 13, they include bodies of revolution other than a true cylinder. "Fluid" as used in the foregoing includes any of the substances, i. e. liquids, gases, slurries, semisolids, etc. whose flow is controlled by the valve, as well as other pressure fluids from an independent source such as compressed air. Other aspects of and the manner of controlling the valve will be discussed infra.

From the foregoing, it will be observed that upon a pressure fluid being supplied to the interior of the flexible cylinder tending to inflate or extend it from a collapsed or introverted condition, its annular body progresses along the orifice member 13 with a rolling action and with intimate frictionless sealing contact therewith, and, in so doing, closes the orifices 15, and thereby closes the valve. When the internal pressure within the flexible cylinder is relieved to cause it to introvert, its annular body progressively peels or rolls away from the orifice member, similarly without friction, to uncover the orifices, and thereby opens or partially opens the valve. It is also noteworthy that the flexible cylinder provides its own fluid-actuating surfaces and hence is inherently self-servo in its action.

Referring to Figs. 3 and 4 illustrating a modified form of sealing means for an axial flow valve as described in the foregoing, the general similarity of valve body 10, orifice member 13 and partition 16 to like parts of the Figs. 1 and 2 form valve will be apparent. However, a modified sealing means 28 is employed, which, rather than being formed as a closed-ended cylinder, is formed as an open-end annulus or tube. One end 29 of the flexible tube is affixed as by vulcanizing to the orifice member 13 along a circumference slightly to the rear of the orificed zone thereof, and its other end 30 is similarly affixed to the after end of a rigid cylindrical deflector 31 disposed internally of said tube. The upstream end of the deflector is closed by a streamlined head 31a which is exposed to the pressure of the incoming fluid, and its after end portion has reduced diameter to provide an annular space for accommodating said flexible tube.

The deflector 31 in conjunction with the partition 16 of the orifice member 13 provides a closed control chamber, which is sealed by the flexible tube 28, to which a control pressure fluid may be supplied through a tube or passage 20. It will be observed that the piston head end 31a of the deflector 31 has lesser diameter than the internal diameter of the orifice member so that it may move freely with respect thereto. During such movement, it is supported by the flexible tube 28, which permits its axial motion. While the flexible tube is exposed to both the upstream pressure and the pressure of the actuating fluid in the control chamber, the rigid ends of the deflector provide the major piston areas on which said pressures are effective, so that stress on the flexible tube is relatively small.

With the distinction that a rigid piston is here provided, the tube-form sealing means operates generally similar to the cylindrical form thereof previously described, as the flexible tube 28 progresses with a rolling action to seal the orifice member with frictionless intimate contact therewith, upon an actuating fluid at a pressure equal to or in excess of the upstream pressure being supplied to the control chambers. Conversely, as the pressure within the control chamber is relieved, resulting in axial movement of the rigid member 31 to the right, the flexible tube 28 introverts and in so doing peels or rolls away from the surface of the orifice member 13, similarly without any sliding friction. When the sealing means 28 is collapsed or introverted as in Fig. 4, the streamlined piston 31a of the rigid deflector 31 aids in providing a continuous streamlined flow passage through the valve body 10.

Figs. 5 and 6 illustrate another variant of sealing means according to the invention, illustratively incorporated in an axial flow valve characterized by a valve body 10, orifice member 13 and partition 16 generally similar to like parts of the prior described valves. Here, the sealing member takes the form of a hollow annulus appearing in cross section as a flattened closed loop, thus to have substantially cylindrical form. Two such annuli 38, 40, one disposed within the other, are employed in a sealing assembly also including a cup-shaped control piston 41, a fixed tubular supporting grid 42 disposed internally of the inner annulus 40, and a fixed deflector 43 disposed within the grid 42, the deflector having a streamlined fore end and a closed after end 43a. The cylindrical skirt of the control piston 41 is sandwiched between the annuli 38, 40 in such manner that its head end divides the space between the orifice member partition 16 and the closed after end 43a of the deflector 43 into two closed control chambers, the annuli further sealing said chambers and supporting the piston for axial movement.

The outer annulus 38 is held at two opposed points on its outer and inner diameters, respectively, to both the fixed orifice member 13 and the skirt of the piston 41. Similarly, the inner annulus 40 is held at two opposed points on its outer and inner diameters, respectively, to both the piston skirt and the fixed grid 42. Accordingly, the desired indexing of the assembly is maintained, whereby upon axial movement of the piston, the annuli roll on both orifice member 13 and grid member 42, in manner generally analogous to the rolling motion of tank treads. Sealing of the flexible annuli 38 and 40 to their rigid adjacent members can be further assisted if their holding points are provided as by raised projections 38a, 38b and 40a, 40b, respectively, seating in corresponding grooves in said members upon the annuli being inflated as will be described.

Being hollow, the annuli 38, 40 each forms a closed pressure vessel which may be filled with a pressure fluid separately or in combination. Illustratively, the outer annulus 38 is internally pressurized by a pressure fluid supplied through a passage 45 from an external source, and the inner annulus 40 is similarly internally pressurized by the controlled fluid at the upstream pressure which enters its interior space through a passage 46 in the wall of the grid 42 communicating with the annulus interior. Internal pressurizing of the annuli 38, 40 insures their rolling action without rubbing of their interior surfaces, and also insures positive sealing of the outer annulus 38 on the interior surface of the orifice member 13.

Operating fluid pressures are supplied to the aforesaid control chambers by means of a passage 47 (corresponding to the passage 20 of the earlier described modifications) communicating with the after chamber and a passage 48 communicating with the fore chamber. Suitable pressure differentials existing in said chambers causes axial motion of the control piston 41 in desired direction. When applied to cause piston movement to the left (valve closing direction), the annuli 38, 40 roll on the inner surface of the orifice member 13 and the outer surface of the grid member 41 as explained above, and in such manner as to have intimate frictionless contact therewith, the outer annulus 38 thus sealing the orifice 15 of the orifice member. When the differential pressures in the control chambers are applied in direction to cause motion of the piston to the right (valve opening direction), the annuli 38, 40 roll in the opposite direction to uncover the orifices and permit flow through the valve.

It will be noted that the total surface area of the annuli 38, 40 exposed to the upstream pressure is small as compared to the opposite piston face areas of the control piston 41, so that the operating pressures can be less than line pressure.

Referring to Fig. 7, there is illustrated a further variant which resembles the Figs. 5 and 6 form as respects the provision of fore and aft control chambers defined by a piston corresponding to the piston 41 and two rolling annuli 38, 40 of substantially cylindrical form as aforesaid, which seal these piston chambers while permitting axial motion of the piston. However, according to the present form, the orificed zone of the orifice member 53 is skeletonized or eliminated entirely so as to provide a substantially unobstructed annular outflow passage 54 through the valve body. Moreover, the skirt of the control piston is elongated so as to form a tube 55 which in the closed position covers said annular outflow passage. Sealing of said passage is effected by a free-rolling flexible annulus 56 encircling the upstream end of the piston tube 56. Preferably, the flexible annulus has initially circular section, the diameter of which is somewhat greater than the radial spacing between tube 56 and entrance end 10a of the valve body, so that it flattens upon the tube moving into said entrance end. This flexible annulus may be hollow or tubular as shown, with initial inflation, or it may be inflated by the incoming fluid, or it may have solid section. In any instance, rolling, not sliding, contact between sealing annulus 56 and the cylindrical entrance end 10a of the valve body is achieved.

To retain the annulus 56 on the tube 55 while permitting it to roll freely, the tube is provided with two series of circumferentially spaced projections 57, 58 which together serve to bracket the annulus, as well as to support it against upstream pressure and insure its desired limits of axial travel on the piston tube. Obviously, the annulus 56 can equally well be retained on the inner surface of the cylindrical entrance end of the valve body, in which case it functions as a rolling seal in the manner explained.

According to the present modification, the fixed grid 42 and deflector 43 of the Figs. 5–6 form may be replaced by the rigid member 60 on which the inner control piston annulus 40 rolls. The member 60 acts as a streamlined deflector and its closed after end as the forward bulkhead of the fore control chamber. The rigid member 60 may be supported from its accessible fore end by struts 61 which of course can have a variety of shapes and numbers. The passage 62 (corresponding to the passage 48, Figs. 5 and 6) for supplying a control pressure fluid to the fore chamber may extend through one of the struts 61 in the manner shown.

Figs. 8, 9 and 10 illustrate the application of a sealing means having the form shown in Figs. 1 and 2 to a valve of the more conventional type wherein the sealing element operates normally to the direction of fluid flow. Thus the flexible sealing member 68 is supported within a substantially cylindrical, i. e. slightly tapered orifice member 69 whose axis is disposed at right angles to the common axis of the inlet and outlet openings 70, 71 of an open top valve casing 72, and which are arranged to provide a straight-line flow path through said casing. The flexible sealing member 68 in this instance may have the form of an open top cup which is slightly tapered to correspond to the taper of the orifice member 69 and which is closed by the top plate 73 of the valve casing, which latter has a depending ring 74 to which the open end of the flexible sealing member is secured as by vulcanizing. The aforesaid taper of the orifice member 69 and corresponding taper of the sealing means 68, and the illustrated mounting of the sealing means has the advantage that the latter may be easily withdrawn from the orifice member 69 with the top plate 73.

The introverting and rolling action of the sealing means 68 is similar to that described in connection with the previous forms, since the upstream pressure is effective on the end or piston face of the sealing means, to the same extent that it is effective on the piston face end of the flexible sealing cylinder 18 of the Figs. 1 and 2 form, for example.

Instead of the valve being of the type in which the inlet and entering passages are coaxially arranged, it may be of the type in which said passages are arranged at right angles as diagrammatically illustrated in Fig. 11.

Fig. 12 diagrammatically illustrates the application of the sealing means to a valve of the multi-outlet type, the arrows extending away from the cylindrical valve body indicating the multiple outlets, and the arrow pointing into the cylindrical body indicating the common inlet pipe.

From the above, it will be appreciated that the invention is concerned primarily with the improved flexible sealing means of the variant forms illustrated and described above as applied to valves and like devices generally, since the latter may vary widely in their rigid elements, depending on design requirements.

For the sake of simplicity, the views illustrating the grid orifices show them to be disposed perpendicularly of the area in which they are located. In practice, this disposition may of course vary, particularly in the larger valves which may profit from the use of chamfers, or non-circular and non-uniform dimension of orifice through their axial length. Also, the use of various nozzle forms in the grid orifices may be availed of without departing from the spirit of the invention.

A variety of materials is available for the construction of valves according to the invention which satisfy the various operating conditions. The flexible sealing means, for example, can be manufactured from natural or synthetic organics such as rubber, buna, butyl, Thiokol, or Silicone rubber, and can be reinforced when required with a variety of material such as rayon or cotton cord, metallic wire, nylon, Teflon, glass fiber, etc. Where such reinforcing materials are used, it is probable that they would be used chiefly along the axis of motion and that the grid orifices, if non-circular, would have their larger dimension along the stronger tensile axis of the flexible element. Reinforcing of the cylindrical and cup-type flexible elements as in Figs. 1 and 9 may be non-directional, however. Non-flexible elements, i. e. housing, grids, deflectors, for example, may be manufactured from the most suitable material, i. e. ferrous, non-ferrous, other inorganic or organic materials best suited to the application.

The mode of operation and control offers great flexibility since many types of structure and control sources are possible. These valves may be operated from the energy of the controlled stream, from an independent source, or from both. Springs or "fluids" under pressure can be used to store energy and/or establish operating characteristics. Springs where used may be installed inside the valve body in or out of the actuating chamber. The variety of linear and non-linear spring rates with suitable mechanisms may be employed as necessary to give, for example, snap action or non-linear force stroke characteristics.

The most simple type of control utilizes no source of energy other than the controlled stream for valve operation, and is applicable to any of the valves described. For example, referring to Fig. 1, control passage 20 may be connected into an external pilot valve diagrammatically indicated at PV, which either connects the passage downstream, shuts it off, or connects it upstream. To keep the valve closed, the control passage 20 is connected upstream whereupon the flexible cylinder will assume its free cylindrical shape, as the pressure inside the cylinder is the upstream pressure. Opening of the pilot valve will remove some or all of the contents of the flexible cylinder resulting in its partial, or its complete collapse, respectively. This control fluid is dumped downstream (reentered into the system), hence avoiding waste unless another arrangement were preferred.

Particularly with the valve variants shown in Figs. 5–7, inclusive, a large opening or closing force is available to overcome resisting forces since the area of the sealing means exposed to upstream pressure is small in comparison to that of the control piston area. Another form of control of major interest makes use of an independent energy source of "fluid" pressure, for example, compressed air. The valve may there become an automatic pressure bleeder if its control chamber is supplied from a constant pressure source. In this application, valve types shown in Figs. 5-7 inclusive can operate with a control pressure lower than line pressure by the design factor $Aup/Acc$ where $Aup$ is upstream piston area, and $Acc$ is control chamber area. Other valve types illustrated herein will regulate upstream pressure at their pilot supply pressures.

Similarly, a wide variety of conditions can be readily accommodated, e. g. differential pressure control, flow rate, check valve action (types shown in Figs. 5-7 inclusive being preferred for latter), pressure relief and regulation. Special valve designs are readily provided for by the combination of valve types and their compounding into multiple element systems. The sealing efficacy of these internally pressurized valves is exceptional and remains so without adjustment or repair for the life of the flexible element. Since full line or even greater pressure may be supplied to the interior of the flexible element to force it against the discharge orifice or grid, the flexible element readily conforms to any irregularities of the grid (orifice member) and effects a complete and self-adjusting seal insensitive to the abrasion, scuffing and corrosion which would seriously limit the usefulness of ordinary valves. The subject valve principle has the additional advantage of permitting efficient sealing of "fluids" having a relatively low value of dynamic viscosity.

Further, the positive and uniformly distributed fluid pressure forces the flexible sealing element into contact with the outlet grid, permitting substantial variations in manufacturing dimensions. Very few surfaces require machining, and this, taken with the inherent simplicity of design, results in fast production and low cost. Contributing to this desirable aim, the shapes involved lend themselves easily to punch press operations and in the larger sizes to simple castings. The virtual absence of frictional contact, of metal to metal parts, and of machined sealing surfaces makes damage from corrosion, abrasion, jamming, thermal expansion, and mishandling negligible.

Inherent servo action of the herein valve principle and its versatility make it well suited to automatic and manual process control in industrial and military installations. In using the valve under manual control, only small control piping need be run to the operating station where a battery or console of pilot valves may be conveniently located and easily operated. In contrast, conventional systems require the operator to move about in a large area and to exert large physical effort to open and close desired valves. Moreover, large piping must often be inconveniently routed to provide operator access in previous installations.

Where very large operating forces are to be rapidly controlled by small output automatic systems, the main flow valve may be controlled by a smaller valve (of the type herein described) which in turn is controlled by the small output device. Such cascading can obviously be continued until very small end devices are adequate for the control of very large powers. This requirement of low-power end devices is often encountered in computer systems, for example. High values of force/inertia ratio further enhance the value of valves operating on the presently disclosed principle when used in automatic servo systems.

Having now described and illustrated several forms of my invention and their operating principles, I wish it to be understood that my invention is not limited to the specific forms or arrangements of parts herein described and shown, or specifically covered by the appended claims, since such are to be interpreted as illustrative and not in a limiting sense.

I claim:

1. In a device of the character described, a valve body having coaxially disposed inlet and outlet means and a radially enlarged control portion therebetween, a generally cylindrical orifice member having its downstream end closed mounted within said enlarged portion so as to provide substantially unrestricted straight-line flow through said body, and sealing means coacting with said orifice member for controlling the passage of fluid therethrough and including an annular member of hollow, substantially cylindrical form having its upstream end closed and being made of flexible material disposed within and being axially positioned with respect to said orifice member so as to be capable of sealing said member when fully extended, said annular member having its closed end exposed to the pressure of the incoming fluid which tends to introvert it, and including another surface being exposed to the pressure of an actuating fluid within the sealing means which tends to extend it, and means for varying the pressure effective on said last surface in accordance with the sealing action desired of said annular member.

2. In a device of the character described, a valve body having coaxially disposed inlet and outlet means and a radially enlarged control portion therebetween, a generally cylindrical orifice member having its downstream end closed mounted within said enlarged portion so as to provide substantially unrestricted straight-line flow through said body, and sealing means coacting with said orifice member for controlling the passage of fluid therethrough and comprising a hollow, substantially cylindrical member having its upstream end closed and being made of flexible material disposed within and being positioned axially with respect to said orifice member so as to be capable of sealing said member when extended to full cylindrical formation, said cylindrical member having its closed end exposed to the pressure of the incoming fluid which tends to introvert it, and being capable of withstanding an internal pressure tending to extend it to its cylindrical formation, and means for varying the internal pressure within said cylindrical member in accordance with the sealing action desired thereof.

3. In a device of the character described, a valve body having coaxially disposed inlet and outlet means and a radially enlarged control portion therebetween, a generally cylindrical orifice member having its downstream end closed mounted within said enlarged portion so as to provide substantially unrestricted straight-line flow through said body, and sealing means coacting with said orifice member for controlling the passage of fluid through said orifice member comprising a hollow, substantially cylindrical member made of flexible material disposed internally of said orifice member and in sealing relation with respect thereto, said cylindrical member being closed at its ends so as to form a closed pressure chamber and having one of its ends exposed to the pressure of the incoming fluid which tends to introvert it with a rolling-away action with respect to the orifice member against the pressure obtaining within said chamber, and means for varying the pressure within said chamber in accordance with the sealing action desired of said cylindrical member.

4. In a device of the character described, a valve body having coaxially disposed inlet and outlet means and a radially enlarged control portion therebetween, a generally cylindrical orifice member having its downstream end closed mounted within said enlarged portion so as to provide substantially unrestricted straight-line flow through said body, and sealing means coacting with said orifice member for controlling the passage of fluid through said orifice member comprising a substantially cylindrical hollow member made of flexible material disposed within said orifice member and being closed at its ends to form a closed chamber, means for supporting the cylindrical member from one end in position so that it may be extended to its full cylindrical formation to progressively seal the orifice member with intimate frictionless contact therewith, the other end of the cylindrical member being exposed to the pressure of the incoming fluid which tends to introvert it with a rolling-away action with respect to the orifice member against the pressure obtaining within said chamber, and means for varying the pressure within said chamber in accordance with the sealing action desired of the cylindrical member.

5. In a device of the character described, a valve body including a hollow, substantially cylindrical orifice member having its downstream end closed disposed in the path of fluid flow therethrough, and sealing means for controlling the passage of fluid through said orifice member including a hollow cylindrical member made of flexible material disposed within and being axially positioned with respect to said orifice member so as to be capable of traveling with a rolling action on said member, and a rigid piston member sealed to one end of said cylindrical member and disposed within and supported by said annular member for axial motion, said piston having a surface exposed to a force dependent on the pressure of the incoming fluid and another surface exposed to an actuating force dependent on the internal pressure obtaining within said cylindrical member, and means for supplying pressure fluid to the interior of said cylindrical member, the construction and arrangement being such that upon the first-named force exceeding the actuating force the piston effects travel of the cylindrical member in one direction and that upon reverse force distribution the piston effects travel of the cylindrical member in the opposite direction.

6. In a device of the character described, a valve body including a hollow, substantially cylindrical orifice member disposed in the path of fluid flow therethrough, and sealing means for controlling the passage of fluid through said orifice member including a hollow, substantially cylindrical member made of flexible material disposed within and being affixed at one end to said orifice member in position such that when fully extended it seals on the orifice member and affixed at its other end to a piston member disposed within said cylindrical member and providing opposite piston faces, one of which is exposed to the pressure of the incoming fluid and the other of which is exposed to the pressure of an actuating fluid within a control chamber provided at one end of said orifice member and which is sealed by said cylindrical member, the construction and arrangement being such that upon the pressure of the incoming fluid exceeding the pressure of the actuating fluid within the chamber, the piston member travels in direction as to introvert the cylindrical member, and that upon the pressure of the actuating fluid overcoming that of the incoming fluid the piston member travels in the opposite direction to extend the cylindrical member.

7. In a device of the character described, a valve body including a hollow, substantially cylindrical orifice member disposed in the path of fluid flow therethrough, and sealing means for controlling the passage of fluid through said orifice member including coaxially disposed outer and inner annuli of flexible material having flattened, closed loop sections disposed within said orifice member, a piston supported for axial motion by said annuli, rigid tubular means fixedly mounted within and sealingly attached to and supporting the inner annulus, the outer annulus cooperating with said orifice member and said piston and the inner annulus cooperating with said rigid tubular means to form two control chambers, and means for introducing pressure fluids to said chambers, the construction and arrangement being such that said piston is actuable in one or the other direction by the pressure differential existing in the control chambers.

8. A device as set forth in claim 7, wherein the piston is provided with a skirt which is sandwiched between said annuli, and the outer annulus is held at points in its outer and inner diameters to the inner surface of the orifice member and the outer surface of the piston skirt, respectively, and the inner annulus is held at two points of its outer and inner diameters to the inner surface of the skirt and the outer surface of said rigid tubular means, respectively, whereby upon motion of the piston the outer annulus rolls on the inner surface of the orifice member and the inner annulus rolls on the outer surface of said rigid tubular means.

9. A device as set forth in claim 8, wherein means are provided for internally pressurizing the annuli.

10. In a device of the character described, a valve body including a substantially cylindrical orifice member providing a flow passage therethrough, and sealing means for controlling the flow passage including coaxially disposed outer and inner annuli of flexible material having flattened, closed loop cross section disposed within said orifice member, a piston having a skirt interposed between and being thereby supported for axial motion by said annuli, rigid tubular means disposed within and supporting the inner annulus and cooperating with both said annuli and said piston to form two control chambers, means securing the outer annulus at points on its outer and inner surfaces to the inner surface of said orifice member and the outer surface of the piston skirt, respectively, means for securing the inner annulus at points on its outer and inner surfaces to the inner surface of the piston skirt and the outer surface of the rigid tubular means, respectively, whereby during axial motion of the piston the outer annulus rolls on the inner surface of the orifice member and the inner annulus rolls on the outer surface of the rigid tubular means, and means for supplying pressure fluids at different pressures to said control chambers, thereby to impart axial motion to the piston.

11. A device as set forth in claim 7, wherein the orifice member is formed with a substantially unobstructed flow member and the piston is provided with an elongated skirt to provide a tube which is adapted to cover said passage upon motion of the piston in one direction, and a rolling seal is operative between the outer surface of the tube and the inner surface of the fluid entrance end of the valve body for sealing said passage.

12. A device as set forth in claim 11, wherein the rolling seal consists of a free rolling annulus of flexible material.

13. A device as set forth in claim 11, wherein the rolling seal consists of a free rolling tubular annulus of flexible material whose unflexed section diameter is greater than the spacing between the tube and entrance end of the valve body, whereby the annulus has flattened cross section in its sealing position.

14. A device as set forth in claim 11, wherein the rolling seal consists of a free rolling tubular annulus of flexible material which is internally pressurized.

15. A combined valve and pressure-motor comprising in combination, a generally cylindrical internal member; a generally cylindrical tubular external member encircling the internal member with substantial annular clearance between said members, said members being relatively movable in the direction of their axes and one member having an annular series of flow ports; a rolling seal bridging said annular clearance and comprising a tube of rubber-like material turned through itself to afford a rolling fold which throughout the operative range of motion of the device yieldingly reacts radially on both members and maintains them in concentric relation, opposite ends of said tube being attached respectively to the internal and to the external member, and the parts being so proportioned and arranged that said rolling tubular seal progressively obstructs and exposes said ports as the internal and external members move progressively in one or the other relative direction; means to move said members in one relative direction; means including a portion of said external member for enclosing a space in which fluid pressure reacting at least in part on said rolling fold develops a force reaction opposing said means; and means for admitting and exhausting pressure fluid to and from said space.

References Cited in the file of this patent

UNITED STATES PATENTS

| | | |
|---|---|---|
| 1,851,062 | Protzer | Mar. 29, 1932 |
| 1,873,138 | Mitchell | Aug. 23, 1932 |
| 2,331,291 | Annin | Oct. 12, 1943 |
| 2,343,584 | Scheele | Mar. 7, 1944 |
| 2,610,564 | Cooper | Sept. 16, 1952 |

FOREIGN PATENTS

| | | |
|---|---|---|
| 19,951 | Germany | Oct. 26, 1882 |